US010738922B2

(12) United States Patent
Rempert et al.

(10) Patent No.: US 10,738,922 B2
(45) Date of Patent: Aug. 11, 2020

(54) FLUID CONDUIT CONNECTION SYSTEM WITH A DOUBLE UNDERCUT CLAMP

(71) Applicant: Caterpillar Inc., Peoria, IL (US)

(72) Inventors: Carl H. Rempert, Shorewood, IL (US); Scott Lee Kordonowy, Shorewood, IL (US); Bryan Rickards, Yorkville, IL (US); Patrick Considine, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 648 days.

(21) Appl. No.: 14/837,161

(22) Filed: Aug. 27, 2015

(65) Prior Publication Data

US 2017/0059069 A1 Mar. 2, 2017

(51) Int. Cl.
*F16L 25/06* (2006.01)
*F16L 21/06* (2006.01)
(Continued)

(52) U.S. Cl.
CPC .......... *F16L 25/009* (2013.01); *B29C 64/386* (2017.08); *F16L 21/06* (2013.01); *F16L 23/036* (2013.01); *F16L 23/04* (2013.01); *F16L 25/065* (2013.01); *G05B 19/4099* (2013.01); *B33Y 10/00* (2014.12); *B33Y 30/00* (2014.12); *B33Y 50/02* (2014.12); *B33Y 80/00* (2014.12);
(Continued)

(58) Field of Classification Search
CPC ....... F16L 25/009; F16L 21/06; F16L 23/036; F16L 25/065; F16L 23/04
USPC .............................. 285/65, 15, 373, 419–420
See application file for complete search history.

(56) References Cited

U.S. PATENT DOCUMENTS

| 1,622,768 | A | | 3/1927 | Cook |
| 2,649,314 | A | * | 8/1953 | Richardson ............. F16L 37/52 285/261 |

(Continued)

FOREIGN PATENT DOCUMENTS

| CN | 101825205 | 3/2009 |
| CN | 103162044 | 6/2013 |

(Continued)

OTHER PUBLICATIONS

Gates Corporation, iLOK™ Coupling, Jun. 2013 (www.gates.com/mining) (6 pages).

(Continued)

*Primary Examiner* — Anna M Momper
*Assistant Examiner* — Fannie C Kee
(74) *Attorney, Agent, or Firm* — Finnegan, Henderson, Farabow, Garrett & Dunner, LLP

(57) ABSTRACT

A conduit connection system may have a first coupling connected to a first conduit. The first coupling may have a first undercut. The conduit connection system may also have a second coupling connected to a second conduit. The second coupling may have a second undercut. The conduit connection system may have a clamp. The clamp may have a first projection. The first projection may be configured to be received in the first undercut. The clamp may have a second projection. The second projection may be configured to be received in the second undercut. The conduit connection system may also include a connector. The connector may be configured to engage with the clamp to connect the first coupling and the second coupling.

13 Claims, 9 Drawing Sheets

(51) Int. Cl.
  *F16L 23/04* (2006.01)
  *F16L 23/036* (2006.01)
  *F16L 25/00* (2006.01)
  *G05B 19/4099* (2006.01)
  *B29C 64/386* (2017.01)
  *B33Y 10/00* (2015.01)
  *B33Y 50/02* (2015.01)
  *B33Y 80/00* (2015.01)
  *B33Y 30/00* (2015.01)

(52) U.S. Cl.
  CPC .............. *G05B 2219/35134* (2013.01); *G05B 2219/49007* (2013.01)

(56) References Cited

U.S. PATENT DOCUMENTS

| | | | | |
|---|---|---|---|---|
| 3,737,180 | A * | 6/1973 | Hayes, Jr. | F16L 41/06 138/99 |
| 3,982,779 | A * | 9/1976 | Hickey | F16L 21/06 285/148.27 |
| 4,015,634 | A * | 4/1977 | Christie | F16L 41/06 138/99 |
| 4,159,132 | A * | 6/1979 | Hitz | F16L 23/02 285/336 |
| 4,236,736 | A * | 12/1980 | Anderson | F16L 33/224 285/125.1 |
| 4,358,140 | A | 11/1982 | Jonsson | |
| 4,660,865 | A * | 4/1987 | Workman | F16L 47/20 156/73.5 |
| 4,790,058 | A * | 12/1988 | Miller | F16L 21/06 138/99 |
| 4,923,350 | A | 5/1990 | Hinksman et al. | |
| 5,104,153 | A | 4/1992 | Corcoran | |
| 5,853,030 | A * | 12/1998 | Walding | F16L 41/12 138/99 |
| 7,390,031 | B2 | 6/2008 | Kraft | |
| 7,410,192 | B2 | 8/2008 | Ignaczak et al. | |
| 7,757,366 | B2 | 7/2010 | Vorley et al. | |
| 8,181,999 | B2 * | 5/2012 | Cromarty | F16L 25/0018 285/419 |
| 9,010,813 | B1 | 4/2015 | Baldwin et al. | |
| 2002/0195820 | A1 | 12/2002 | Surjaatmadja | |
| 2004/0227347 | A1 * | 11/2004 | Fundin | F16L 41/03 285/419 |
| 2006/0066100 | A1 | 3/2006 | Nakashima et al. | |
| 2008/0065259 | A1 * | 3/2008 | Dietrich | G05B 19/4099 700/182 |
| 2010/0225108 | A1 | 9/2010 | Mann | |
| 2010/0289262 | A1 | 11/2010 | Kobayashi | |
| 2012/0061862 | A1 * | 3/2012 | Tharp | B01F 3/04269 261/122.1 |
| 2014/0191502 | A1 | 7/2014 | Gilbreath | |
| 2014/0210203 | A1 | 7/2014 | Lorkowsi | |
| 2015/0000096 | A1 | 1/2015 | Gilbreath | |

FOREIGN PATENT DOCUMENTS

| | | |
|---|---|---|
| DE | 202011003140 | 6/2011 |
| GB | 2066918 | 7/1981 |

OTHER PUBLICATIONS

Prange GmbH, SSKV-Hose Connectors, Feb. 2011 (www.sskv-prange.de) (20 pages).

* cited by examiner

FLUID CONDUIT CONNECTION SYSTEM WITH A DOUBLE UNDERCUT CLAMP

TECHNICAL FIELD

The present disclosure relates generally to a fluid conduit connection system and, more particularly, to a fluid conduit connection system with a double undercut clamp.

BACKGROUND

Industrial machinery, for example, earth moving, mining, or construction machines, often include conduits (pipes and hoses) that carry fluids (gases or liquids) under pressure. For example, conduits in earth moving, mining, or construction machines may carry pressurized hydraulic fluid, which may be used to move one or more actuators to perform various operations. Operation of such machines often requires connection or disconnection of adjacent conduits, for example, to move the machines from one work location to another.

Adjacent connectable conduits used in these machines may include corresponding male and female end portions. Connecting adjacent conduits may involve mating the male and female end portions and securely attaching the end portions to each other so that the conduits do not get disconnected during operation of the machinery. The end portions may be attached to each other using a variety of clamping devices, which may include, for example, threaded connectors, spring-loaded connectors, flanged connectors with fasteners, etc. To improve operational efficiency, it may be desirable to use clamping devices that allow quick connection and disconnection of the conduits, while still preventing leakage of fluid from the conduits when connected.

The clamping devices used to connect the adjacent conduits may wear out over time due to abrasion caused by repeated connection and disconnection of conduits, because of the exposure of the clamping devices to corrosive fluids within or outside the conduits, and/or because of stresses induced in the clamping devices due to the high pressure in the conduits. Thus, the clamping devices used to attach the end portions of the conduits may need periodic replacement. Therefore, it may also be desirable to have clamping devices that can be easily replaced at a worksite.

U.S. Pat. No. 7,390,031 of Kraft, issued on Jun. 24, 2008 ("the '031 patent"), discloses a quick-connect conduit coupling device. In particular, the '031 patent discloses two coupling members, each having a central opening. The '031 patent discloses that one coupling member has a tapered slot and that the other coupling member has a wedge-like element which slides into the tapered slot. The '031 patent further discloses that both the coupling members include an annular groove for receiving a gasket. According to the '031 patent, the gasket has an annular portion of compressible resilient material and another portion that is less compressible. The '031 patent discloses that the less compressible portion of the gasket is securely seated in the annular groove of one of the coupling members so that the gasket does not slide off as the coupling members slide against each other. Further, the '031 patent discloses that a locking pin or fastener may be used to align the two coupling members and to prevent the two coupling members from sliding out and disengaging due to vibration and/or mechanical twisting of the parts.

Although the '031 patent discloses a quick-connect conduit coupling device, the disclosed coupling device may still be less than optimal. In particular, the disclosed coupling device requires sliding one coupling member attached to one conduit into another coupling member attached to an adjacent conduit. Sliding the coupling members into each other may require the operator to lift and/or move the conduits relative to each other. The size and weights of the conduits and the amount of space available in the work area may make such movement difficult and may cause operator fatigue. Additionally, the coupling device of the '031 patent requires a gasket that has two portions with different compressibility values. The use of such a specialized gasket may increase the cost of using and replacing the coupling device of the '031 patent. The coupling members disclosed in the '031 patent may also move relative to each other and cause disconnection of the conduits if the locking pin or fastener degrade, fail, or are inadvertently not assembled The conduit connection system of the present disclosure solves one or more of the problems set forth above and/or other problems of the prior art.

SUMMARY

In one aspect, the present disclosure is directed to a conduit connection system. The conduit connection system may include a first coupling connected to a first conduit. The first coupling may include a first undercut. The conduit connection system may also include a second coupling connected to a second conduit. The second coupling may include a second undercut. The conduit connection system may include a clamp. The clamp may have a first projection. The first projection may be configured to be received in the first undercut. The clamp may also have a second projection. The second projection may be configured to be received in the second undercut. The conduit connection system may also include a connector. The connector may be configured to engage with the clamp to connect the first coupling and the second coupling In another aspect, the present disclosure is directed to a clamp shell. The clamp shell may include a hub. The hub may extend from a clamp proximate end to a clamp distal end. The hub may also have a generally semi-cylindrical shape disposed about a longitudinal axis. The clamp shell may further include a first hinge knuckle extending radially outward from the hub. The clamp shell may also include a second hinge knuckle extending radially outward from the hub. The first hinge knuckle and the second hinge knuckle may be disposed on opposite sides of the hub. The clamp shell may include a first projection extending radially inward from the hub adjacent the clamp proximate end. The clamp shell may also include a second projection extending radially inward from the hub adjacent the clamp distal end. In addition the clamp shell may include a first hole disposed in the first hinge knuckle. The clamp shell may also include a second hole disposed in the second hinge knuckle.

In yet another aspect, the present disclosure is directed to a coupling. The coupling may include an outer surface extending from a coupling proximate end to a coupling distal end. The outer surface may be generally cylindrical and may be disposed about a longitudinal axis. The coupling may include an undercut disposed on the outer surface between the coupling proximate end and the coupling distal end. The undercut may include a first annular surface disposed between the coupling proximate end and the coupling distal end. The first annular surface may be generally orthogonal to the longitudinal axis. The undercut may also include a second annular surface disposed between the first annular surface and the coupling distal end. The second annular surface may be axially spaced apart from the first annular surface and may be inclined relative to the longitudinal axis. In addition, the undercut may include an undercut inner surface extending axially between the first annular surface and the second annular surface.

DETAILED DESCRIPTION

Figure 1:
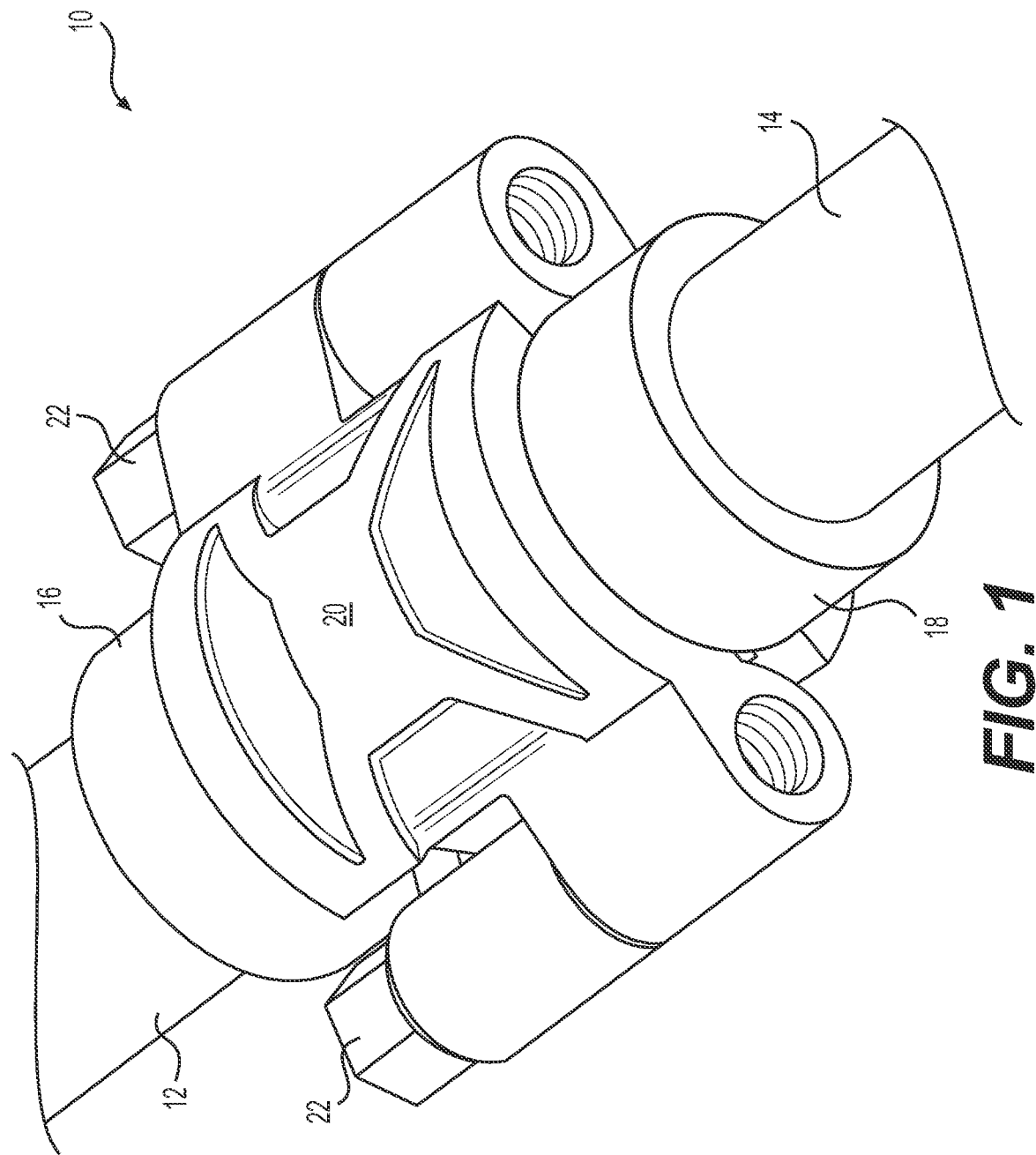
FIG. 1 is an illustration of an exemplary disclosed conduit connection system.

FIG. 1 illustrates an exemplary conduit connection system 10. Conduit connection system 10 may be used to hydraulically connect first conduit 12 with second conduit 14. In some exemplary embodiments, first and second conduits 12, 14 may be pipes and/or hoses associated with a machine (not shown) configured to be used, for example, in construction, earth moving, and/or mining industries. First and second conduits 12 and 14 may be configured to carry pressurized fluids, which may include gases, liquids, hydraulic fluids, lubrication fluids, mixtures of gases and liquids, etc. Conduit connection system 10 may allow pressurized fluids to pass from first conduit 12 to second conduit 14 and vice-versa, while reducing and/or eliminating leakage of the fluids from conduit connection system 10. In some exemplary embodiments, the pressure within first and second conduits 12 and 14 may range between, for example, 3000 psi to 6000 psi.

Figure 2:
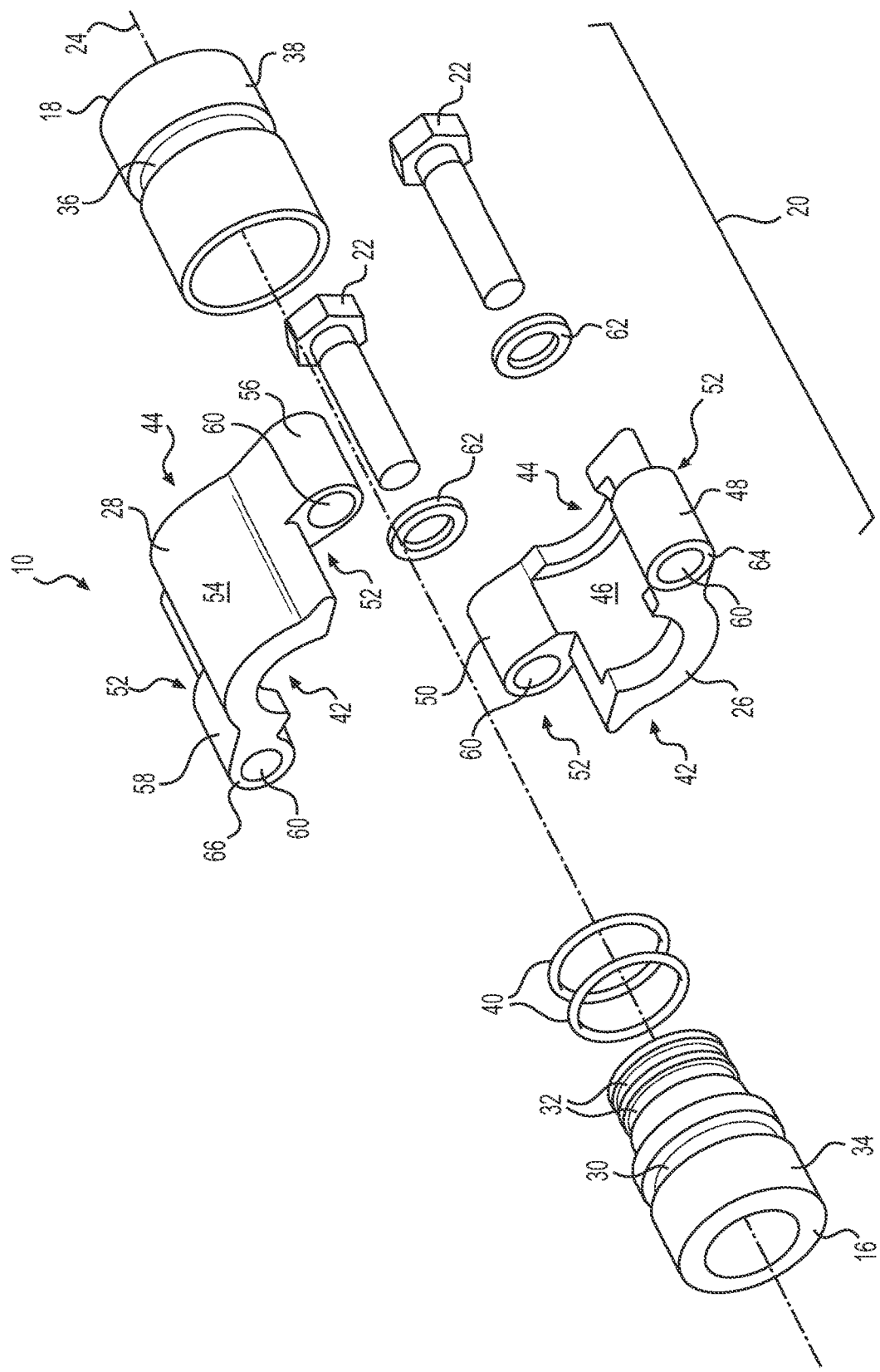
FIG. 2 is an exploded view of the exemplary disclosed conduit connection system of FIG. 1.

Conduit connection system 10 may include first coupling 16, second coupling 18, clamp 20, and connector 22. FIG. 2 illustrates an exploded view of an exemplary disclosed conduit connection system 10. First coupling 16, second coupling 18, and clamp 20 may be disposed around a longitudinal axis 24. Clamp 20 may include first clamp shell 26 and second clamp shell 28. As illustrated in FIG. 2, first coupling 16 may include first undercut 30 and one or more grooves 32. First undercut 30 and grooves 32 may be disposed circumferentially around first outer surface 34 of first coupling 16. First undercut 30 and grooves 32 may be axially separated from each other. Like first coupling 16, second coupling 18 may include second undercut 36, which may be disposed circumferentially around second outer surface 38 of second coupling 18. Conduit connection system 10 may also include seal members 40, which may be configured to be received in grooves 32. In one exemplary embodiment as illustrated in FIG. 2, first coupling 16 may have two grooves 32 configured to receive two seal members 40. It is contemplated, however, that first coupling 16 may have any number of grooves 32, each groove 32 being configured to receive a seal member 40. Likewise, it is contemplated that conduit connection system 10 may include any number of seal members 40 corresponding to a number of grooves 32.

First clamp shell 26 and second clamp shell 28 may be configured to engage with first and second undercuts 30, 36, enclose first and second couplings 16, 18, and seal members 40, and be connected to each other. First and second clamp shells 26, 28 may each extend axially from clamp proximate end 42 to clamp distal end 44. First clamp shell 26 may include first hub 46, first hinge knuckle 48, and second hinge knuckle 50. First hub 46 may have a generally semi-cylindrical shape and may extend axially from clamp proximate end 42 to clamp distal end 44. First and second hinge knuckles 48, 50 may be disposed on opposite sides of first hub 46. In one exemplary embodiment as illustrated in FIG. 2, first and second hinge knuckles 48, 50 may be disposed on diametrically opposite ends of first hub 46. First hinge knuckle 48 may extend substantially radially outward from first hub 46. First hinge knuckle 48 may extend axially from clamp proximate end 42 to adjacent clamp intermediate point 52 disposed between clamp proximate end 42 and clamp distal end 44. Second hinge knuckle 50 may extend substantially radially outward from first hub 46. Second hinge knuckle 50 may extend axially from adjacent clamp intermediate point 52 to clamp distal end 44.

Second clamp shell 28 may include second hub 54, third hinge knuckle 56, and fourth hinge knuckle 58. Second hub 54 may have a generally semi-cylindrical shape and may extend axially from clamp proximate end 42 to clamp distal end 44. Third and fourth hinge knuckles 56, 58 may be disposed on opposite sides of second hub 54. In one exemplary embodiment as illustrated in FIG. 2, third and fourth hinge knuckles 56, 58 may be disposed on diametrically opposite ends of second hub 54. Third hinge knuckle 56 may extend substantially radially outward from second hub 54. Third hinge knuckle 56 may extend axially from adjacent clamp intermediate point 52 to clamp distal end 44. Fourth hinge knuckle 58 may extend substantially radially outward from second hub 54. Fourth hinge knuckle 58 may extend axially from clamp proximate end 42 to adjacent clamp intermediate point 52.

First, second, third, and fourth hinge knuckles 48, 50, 56, 58 may each include a hole 60. First clamp shell 26 may mate with second clamp shell 28 such that first hinge knuckle 48 may axially abut against third hinge knuckle 56, and hole 60 of first hinge knuckle 48 may be axially aligned with hole 60 of third hinge knuckle 56. Likewise, when first and second clamp shells 26, 28 mate, second hinge knuckle 50 may axially abut against fourth hinge knuckle 58, and hole 60 of second hinge knuckle 50 may be axially aligned with hole 60 of fourth hinge knuckle 58. At least one of holes 60 in first and third hinge knuckles 48, 56 may be tapped. Likewise, at least one of holes 60 in second and fourth hinge knuckles 50, 58 may be tapped. Connectors 22 may engage with holes 60 to attach first clamp shell 26 to second clamp shell 28. In one exemplary embodiment as illustrated in FIG. 2, connectors 22 may be fasteners. Connectors 22 may pass through washers 62 and may threadingly engage with one or more of holes 60 in first, second, third, and fourth hinge knuckles 48, 50, 56, 58 to connect first clamp shell 26 to second clamp shell 28. It is also contemplated, however, that holes 60 in first, second, third, and fourth hinge knuckles 48, 50, 56, 58 may be through holes 60. Fasteners 22 may pass through the through holes 60 and project axially outward from first and second end surfaces 64, 66 of first hinge knuckle 48 and fourth hinge knuckle 58, respectively. As illustrated in FIG. 2, first and second end surfaces 64, 66 may be disposed adjacent clamp proximate end 42. Nuts (not shown) may abut against first end surface 64 and second end surface 66 of first hinge knuckle 48 and fourth hinge knuckle 58, respectively, and may engage with fasteners 22 to connect first and second clamp shells 26, 28.

Figure 3:
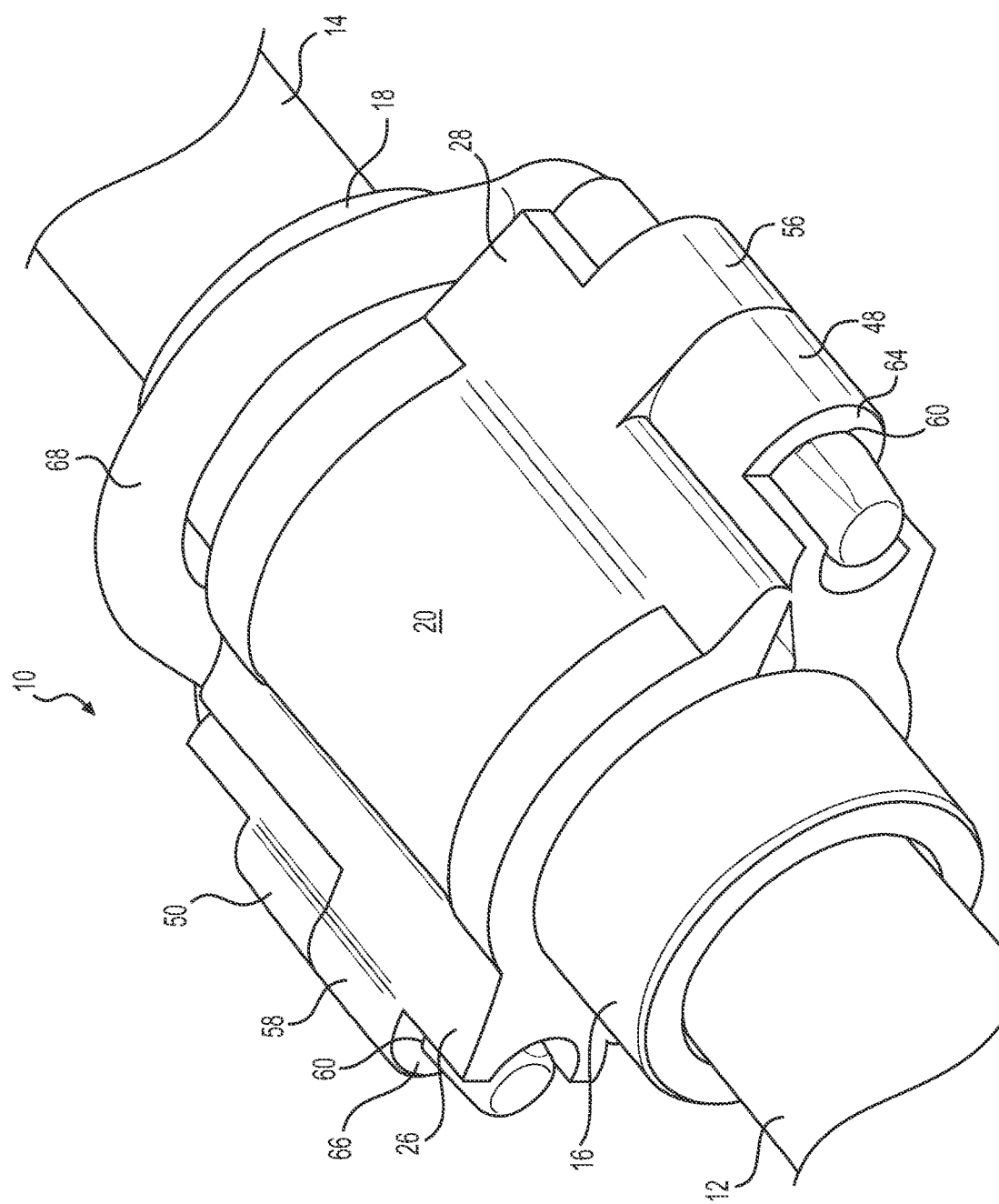
FIG. 3 is an illustration of another exemplary disclosed conduit connection system including an exemplary disclosed clip.

Although FIG. 2 illustrates fasteners 22, it is contemplated that first and second clamp shells 26, 28 may be attached to each other using other attachment methods. For example, FIG. 3 illustrates an exemplary conduit connection system 10 in which clip 68 may be used to connect first and second clamp shells 26, 28. As illustrated in FIG. 3, clip 68 may pass through holes 60 in first and third hinge knuckles 48 and 56 on one side of clamp 20 and through holes 60 in second and fourth hinge knuckles 50, 58 on an opposite side of clamp 20 to attach first clamp shell 26 and second clamp shell 28.

Figure 4:
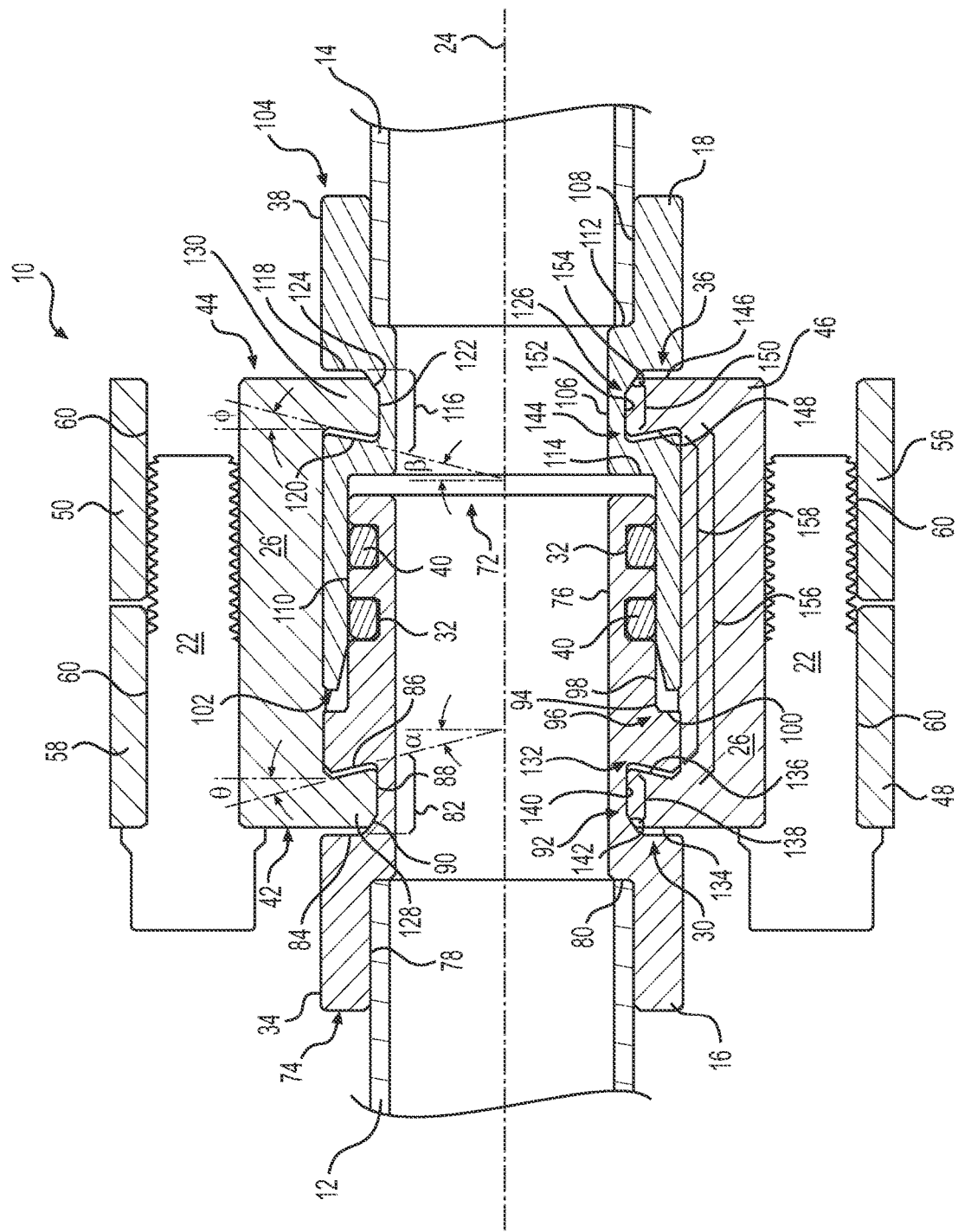
FIG. 4 is a cross-sectional view of the exemplary disclosed conduit connection system of FIG. 1.

FIG. 4 illustrates a cross-section taken through an exemplary disclosed conduit connection system 10. As illustrated in FIG. 4, first coupling 16 may extend axially from first coupling proximate end 72 to first coupling distal end 74. First coupling 16 may include first coupling bore 76 and first counterbore 78. First coupling bore 76 may extend axially between first coupling proximate end 72 and first counterbore base 80 disposed between first coupling proximate end 72 and first coupling distal end 74. First counterbore 78 may extend axially between first coupling distal end 74 and first counterbore base 80. First counterbore 78 may have a diameter, which may be larger than a diameter of first coupling bore 76. First counterbore 78 may be configured to receive first conduit 12, which may be attached to first counterbore 78 via an interference fit, brazing, welding, crimping, or by any other method of attachment known in the art. In other exemplary embodiments, first counterbore 78 and first conduit 12 may be threaded and first conduit 12 may be threadingly attached to first counterbore 78.

First undercut 30 may be disposed between first coupling proximate end 72 and first coupling distal end 74. In one exemplary embodiment as illustrated in FIG. 3, first undercut 30 may be disposed between first counterbore base 80 and first coupling proximate end 72. First undercut 30 may include first undercut inner surface 82, first annular face 84, and second annular face 86. First undercut inner surface 82 may extend axially from first annular face 84 to second annular face 86. First undercut inner surface 82 may have a diameter, which may be smaller than a diameter of first outer surface 34 of first coupling 16. First annular face 84 may be located between first coupling proximate end 72 and first coupling distal end 74. First annular face 84 may be disposed nearer to first counterbore base 80 relative to first coupling distal end 74. First annular face 84 may be disposed generally orthogonal to longitudinal axis 24. As used in this disclosure, the terms "about" and "generally" indicate typical manufacturing tolerances and dimensional rounding. Thus, for example, the terms "about" and "generally" may represent an angular variation of ±1° from a nominal value. Second annular face 86 may be axially spaced apart from first annular face 84 and may be disposed between first annular face 84 and first coupling proximate end 72. Second annular face 86 may be inclined at an angle "a" relative to a plane disposed generally orthogonal to longitudinal axis 24. One of ordinary skill in the art would understand that second annular face 86 would also be inclined relative to first annular face 84. As illustrated in FIG. 4, second annular face 86 may be inclined away from first coupling proximate end 72 and towards first coupling distal end 74. In one exemplary embodiment, angle α may range between about 10° and 20°.

First undercut inner surface 82 may include first portion 88 and second portion 90. First portion 88 may extend axially from second annular face 86 to first undercut intermediate point 92 disposed between first annular face 84 and second annular face 86. First portion 88 may have a generally cylindrical shape having a generally uniform diameter. Second portion 90 may extend from first annular face 84 to first undercut intermediate point 92. Second portion 90 may have a generally conical shape, having a diameter adjacent first annular face 84, which may be larger than a diameter of second portion 90 adjacent first undercut intermediate point 92. In one exemplary embodiment as illustrated in FIG. 4, the diameter of second portion 90 adjacent first undercut intermediate point 92 may be about equal to a diameter of first portion 88.

First coupling 16 may include shoulder 94 extending from first coupling proximate end 72 to shoulder end 96 disposed between first coupling proximate end 72 and second annular face 86. Shoulder 94 may include a generally cylindrical shoulder outer surface 98, which may extend axially from first coupling proximate end 72 to adjacent shoulder end 96. Shoulder outer surface 98 may have a diameter, which may be smaller than a diameter of first outer surface 34 of first coupling 16. In one exemplary embodiment as illustrated in FIG. 4, shoulder outer surface 98 may have a diameter, which may be larger than a diameter of first undercut inner surface 82. Shoulder 94 may also include shoulder end face 100 disposed adjacent shoulder end 96. Shoulder end face 100 may be disposed generally orthogonal to shoulder outer surface 98. One or more grooves 32 may be disposed circumferentially on shoulder outer surface 98. Grooves 32 may be disposed between first coupling proximate end 72 and shoulder end 96 and likewise between first coupling proximate end 72 and first undercut 30.

As illustrated in FIG. 4, second coupling 18 may extend axially from a second coupling proximate end 102 to a second coupling distal end 104. Second coupling 18 may include a second coupling bore 106, second counterbore 108, and third counterbore 110. Second coupling bore 106 may extend axially between second counterbore base 112 and third counterbore base 114. Second counterbore base 112 may be disposed between second coupling proximate end 102 and second coupling distal end 104. Third counterbore base 114 may be disposed between second coupling proximate end 102 and second counterbore base 112. Second counterbore 108 may have a diameter, which may be larger than a diameter of second coupling bore 106. Second counterbore 108 may be configured to receive second conduit 14, which may be attached to second counterbore 108 via an interference fit, brazing, welding, crimping, or by any other method of attachment known in the art. In other exemplary embodiments, second counterbore 108 and second conduit 14 may be threaded and second conduit 14 may be threadingly attached to second counterbore 108.

Third counterbore 110 may have a diameter, which may be larger than a diameter of second coupling bore 106. In one exemplary embodiment as illustrated in FIG. 4, the diameter of third counterbore 110 may also be larger than a diameter of second counterbore 108. The diameter of third counterbore 110 may be larger than a diameter of shoulder outer surface 98 of first coupling 16. As illustrated in FIG. 4, second coupling 18 may be configured to receive first coupling 16. For example, third counterbore 110 of second coupling 18 may be configured to receive shoulder outer surface 98 of first coupling 16.

Seal members 40 may be disposed in grooves 32 of shoulder outer surface 98 of first coupling 16. As illustrated in FIG. 4, seal members 40 may be disposed between grooves 32 and third counterbore 110. Seal members 40 may be disposed between shoulder outer surface 98 and third counterbore 110 in a compressed condition, which may provide the forces necessary to retain seal members 40 within grooves 32. Compressed seal members 40 may help reduce or eliminate leakage of pressurized fluids from within first and second conduits 12, 14 to the ambient. In one exemplary embodiment as illustrated in FIG. 4, seal member 40 may be an O-ring. It is contemplated, however, that seal member 40 may be a gasket or any other type of sealing element known in the art.

Second undercut 36 may be disposed between second coupling proximate end 102 and second coupling distal end 104. In one exemplary embodiment as illustrated in FIG. 4, second undercut 36 may be disposed between second counterbore base 112 and third counterbore base 114. Second undercut 36 may include second undercut inner surface 116, third annular face 118, and fourth annular face 120. Second undercut inner surface 116 may extend axially from third annular face 118 to fourth annular face 120. Second undercut inner surface 116 may have a diameter, which may be smaller than a diameter of second outer surface 38 of second coupling 18. Third annular face 118 may be located nearer to second counterbore base 112 relative to third counterbore base 114. Third annular face 118 may be disposed generally orthogonal to longitudinal axis 24. Fourth annular face 120 may be axially spaced apart from third annular face 118 and may be located between third counterbore base 114 and third annular face 118. Fourth annular face 120 may be inclined at an angle "β" relative to a plane disposed orthogonal to longitudinal axis 24. One of ordinary skill in the art would understand that fourth annular face 120 would also be inclined relative to third annular face 118. As illustrated in FIG. 4, fourth annular face 120 may be inclined away from second coupling proximate end 102 and towards second coupling distal end 104. Angle β may be the same as or different from angle α. In one exemplary embodiment, angle β may range between about 10° and 20°.

Second undercut inner surface 116 may include third portion 122 and fourth portion 124. Third portion 122 may extend axially from fourth annular face 120 to second undercut intermediate point 126 disposed between third annular face 118 and fourth annular face 120. Third portion 122 may have a generally cylindrical shape, having a generally uniform diameter. Fourth portion 124 may extend from third annular face 118 to second undercut intermediate point 126. Fourth portion 124 may have a generally conical shape, having a diameter adjacent third annular face 118, which may be larger than a diameter of fourth portion 124 adjacent second undercut intermediate point 126. In one exemplary embodiment as illustrated in FIG. 4, the diameter of fourth portion 124 adjacent second undercut intermediate point 126 may be about equal to a diameter of third portion 122.

As further illustrated in FIG. 4, first clamp shell 26 may include first hub 46, first projection 128, and second projection 130. First projection 128 may be disposed adjacent clamp proximate end 42 and may extend generally radially inward from first hub 46. First projection 128 may extend axially from clamp proximate end 42 to first projection end 132 disposed between clamp proximate end 42 and clamp distal end 44. First projection 128 may be received within first undercut 30. First projection 128 may have first face 134, second face 136, and first projection inner surface 138. First face 134 may be disposed at clamp proximate end 42 and may have an annular shape. First face 134 may be disposed generally orthogonal to longitudinal axis 24. Second face 136 may be disposed adjacent first projection end 132, axially spaced apart from first face 134. Second face 136 may have a generally annular shape and may be inclined at an angle "θ" relative to a plane orthogonal to longitudinal axis 24. Angle θ may be the same as or different from angles α and β. In one exemplary embodiment, angle θ may range from about 10° to 20°.

First projection inner surface 138 of first projection 128 may include a fifth portion 140 and a sixth portion 142. Fifth portion 140 may extend axially from second face 136 to adjacent first undercut intermediate point 92. Fifth portion 140 may have a generally cylindrical shape having a generally uniform diameter. Sixth portion 142 may extend axially from first face 134 to adjacent first undercut intermediate point 92. Sixth portion 142 may have a generally conical shape, having a diameter adjacent first face 134, which may be larger than a diameter of sixth portion 142 adjacent first undercut intermediate point 92. In one exemplary embodiment as illustrated in FIG. 4, the diameter of sixth portion 142 adjacent first undercut intermediate point 92 may be about equal to a diameter of fifth portion 140. Fifth portion 140 of first projection inner surface 138 may be disposed adjacent to first portion 88 of first undercut 30. Similarly, sixth portion 142 of first projection inner surface 138 may be disposed adjacent to second portion 90 of first undercut 30.

Second projection 130 may be disposed adjacent clamp distal end 44 and may extend generally radially inward from first hub 46. Second projection 130 may extend axially from clamp distal end 44 to second projection end 144 disposed between clamp distal end 44 and first projection end 132. Second projection 130 may be received within second undercut 36. Second projection 130 may have third face 146, fourth face 148, and second projection inner surface 150. Third face 146 may be disposed at clamp distal end 44 and may have an annular shape. Third face 146 may be disposed generally orthogonal to longitudinal axis 24. Fourth face 148 may be disposed adjacent second projection end 144, axially spaced apart from third face 146. Fourth face 148 may have a generally annular shape and may be inclined at an angle "φ" relative to a plane orthogonal to longitudinal axis 24. Angle φ may be the same as or different from angles α, β, and θ. In one exemplary embodiment, angle φ may range from about 10° to 20°.

Second projection inner surface 150 of second projection 130 may include a seventh portion 152 and a eighth portion 154. Seventh portion 152 may extend axially from fourth face 148 to adjacent second undercut intermediate point 126. Seventh portion 152 may have a generally cylindrical shape having a generally uniform diameter. Eighth portion 154 may extend axially from third face 146 to adjacent second undercut intermediate point 126. Eighth portion 154 may have a generally conical shape, having a diameter adjacent third face 146, which may be larger than a diameter of eighth portion 154 adjacent second undercut intermediate point 126. In one exemplary embodiment as illustrated in FIG. 4, the diameter of eighth portion 154 adjacent second undercut intermediate point 126 may be about equal to a diameter of seventh portion 152. Seventh portion 152 of second projection inner surface 150 may be disposed adjacent to third portion 122 of second undercut 36. Similarly, eighth portion 154 of second projection inner surface 150 may be disposed adjacent to fourth portion 124 of second undercut 36.

First and second projections 128, 130 with first hub 46 may form dovetail mortise 156 because of the angles of inclination θ and φ, respectively, of second and fourth faces 136, 148. Likewise, a portion of first outer surface 34 disposed between second annular face 86 and shoulder end 96 together with a portion of second outer surface 38 disposed between second coupling proximate end 102 and fourth annular surface 120 may form a dovetail tenon 158 that may engage with dovetail mortise 156. Pressurized fluids within first and second conduits 12, 14 may push first coupling 16 axially apart from second coupling 18, causing second face 136 of first projection 128 and fourth face 148 of second projection 130 to abut against second annular face 86 and fourth annular face 120, respectively. Thus dovetail mortise 156 of first hub 46 may engage with dovetail tenon 158 to hold first and second coupling 16, 18 together even in the absence of any additional connectors or fasteners. Although FIG. 4 illustrates a cross-sectional view through first clamp shell 26, second clamp shell 28 may have features similar to those described above for first clamp shell 26.

Figure 5:
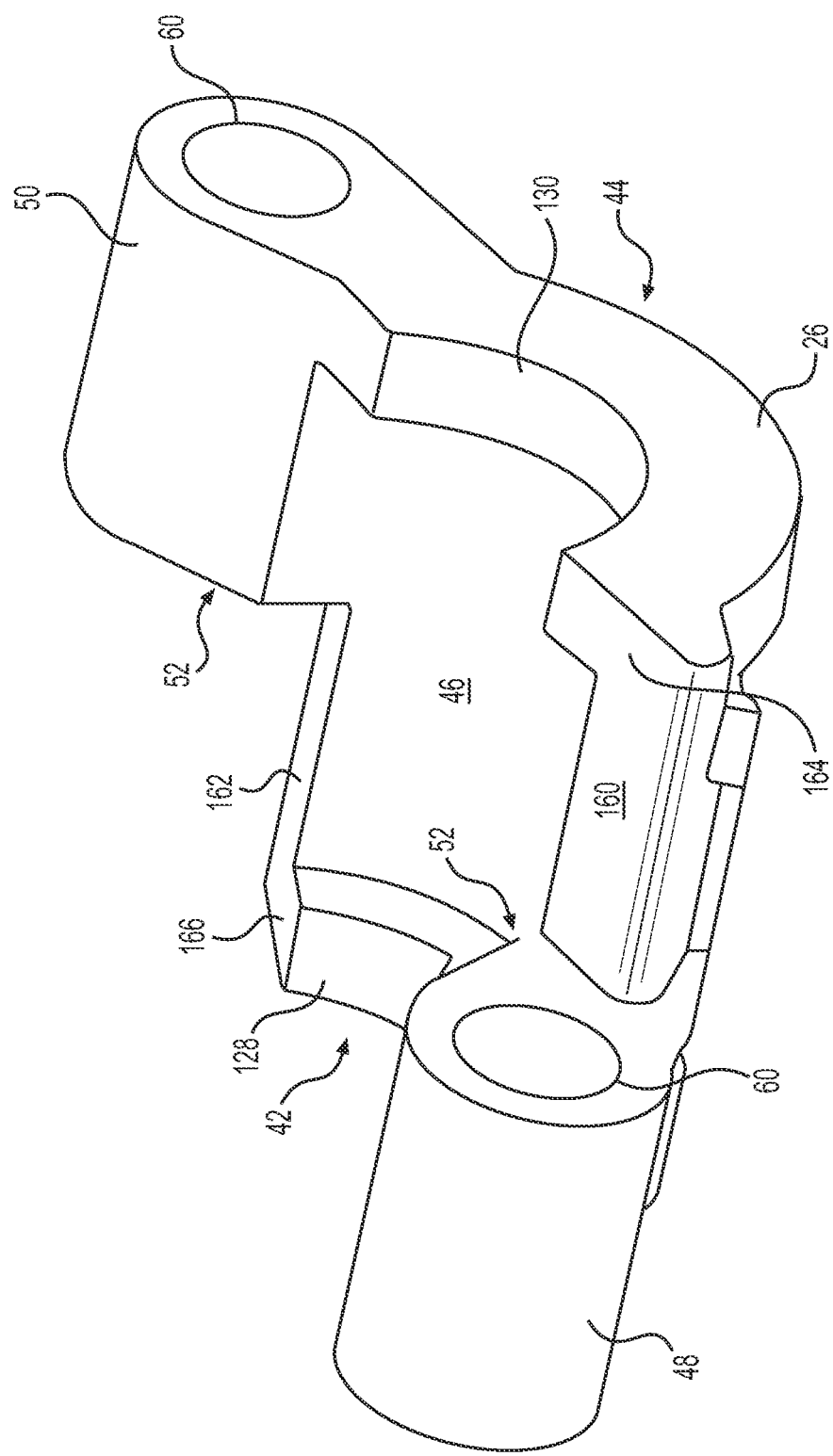
FIG. 5 is an illustration of an exemplary disclosed clamp shell for the conduit connection system of FIGS. 1 and 3.

FIG. 5 illustrates an exemplary embodiment of first clamp shell 26. As discussed above, first clamp shell 26 may include first hub 46, first projection 128, and second projection 130. As illustrated in FIG. 5, first hub 46 may have a generally semi-cylindrical shape. Likewise, first and second projections 128, 130 may also have a generally semi-cylindrical shape. First clamp shell 26 may also include first flat 160 and second flat 162 disposed adjacent first hinge knuckle 48 and second hinge knuckle 50, respectively. In one exemplary embodiment as illustrated in FIG. 5, first flat 160 may be disposed diametrically opposite second hinge knuckle 50, and second flat 162 may be disposed diametrically opposite first hinge knuckle 48. First flat 160 may include first flat surface 164 disposed generally radially. First flat surface 164 may extend axially from adjacent clamp intermediate point 52 to clamp distal end 44. Second flat 162 may include second flat surface 166 disposed generally radially. Second flat surface 166 may extend axially from adjacent clamp intermediate point 52 to clamp proximate end 42. When second clamp shell 28 mates with first clamp shell 26, third hinge knuckle 56 may rest on first flat 160, and fourth hinge knuckle 58 may rest on second flat 162. Like first clamp shell 26, second clamp shell 28 may also include structures similar to first and second flats 160, 162.

Figure 6:
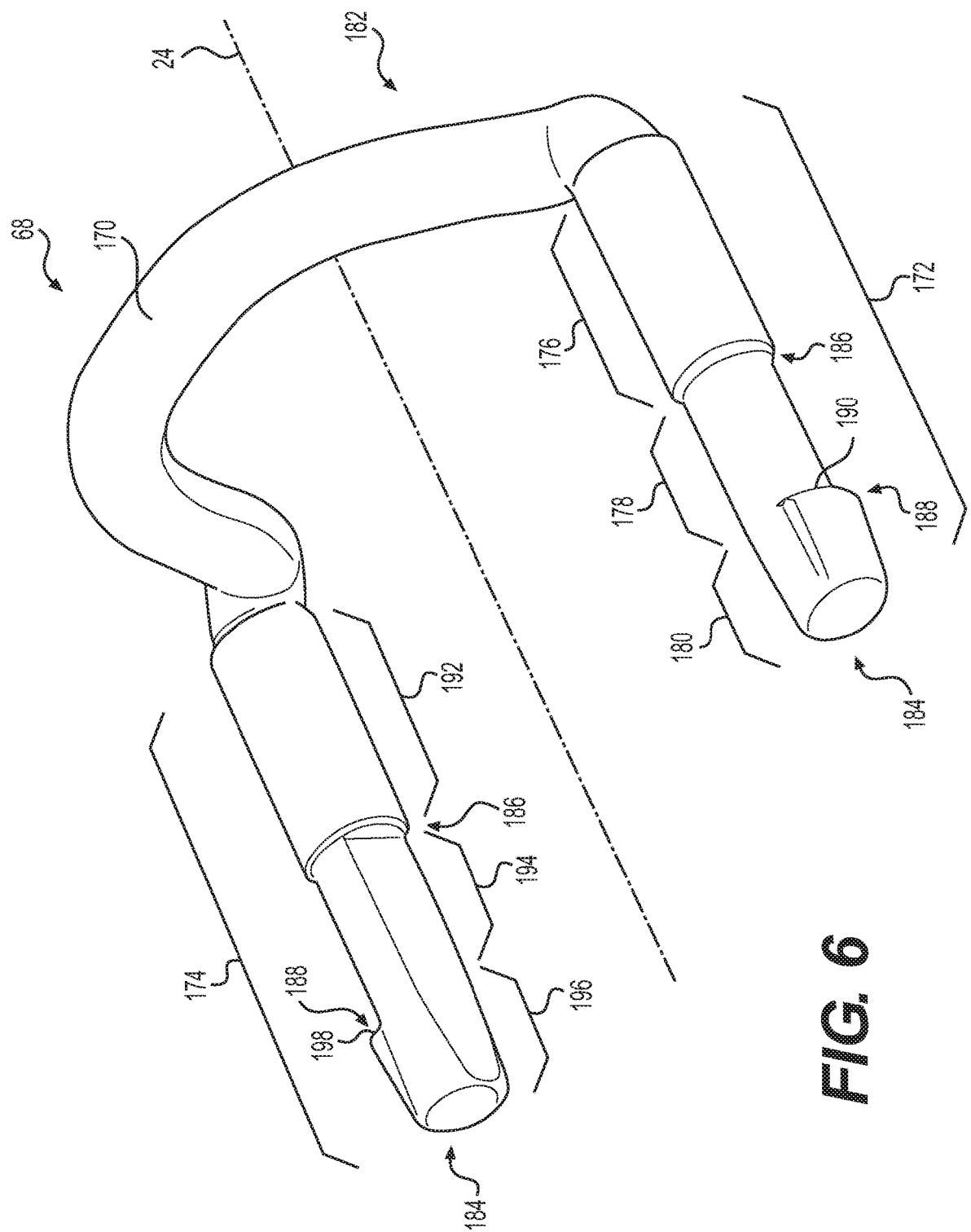
FIG. 6 is an illustration of an exemplary disclosed clip for the conduit connection system of FIG. 3.

FIG. 6 illustrates an exemplary embodiment of clip 68. As illustrated in FIG. 6, clip 68 may include center portion 170, first leg 172, and second leg 174. Center portion 170 may have a generally semi-circular shape, which may be disposed generally orthogonal to longitudinal axis 24. First and second legs 172, 174 may be disposed generally orthogonal to center portion 170 and generally parallel to longitudinal axis 24. First and second legs 172, 174 may extend outward from center portion 170 and may be diametrically spaced apart from each other. First leg 172 may include first base portion 176, first extension 178, and first tip 180. First base portion 176 may extend axially from center portion 170 at clip proximate end 182 to base end 186. First base portion 176 may have a generally cylindrical shape, which may have a diameter smaller than a diameter of holes 60. First extension 178 may extend axially from base end 186 to extension end 188. First extension 178 may have a generally cylindrical shape, which may have a diameter smaller than a diameter of first base portion 176. First tip 180 may extend axially from extension end 188 to clip distal end 184. First tip 180 may have a generally frusto-conical shape, having a diameter less than a diameter of holes 60 at clip distal end 184 and a diameter larger than a diameter of first extension 178 at extension end 188. First tip 180 may include first notch surface 190 at extension end 188. First notch surface 190 may be disposed generally orthogonal to longitudinal axis 24.

Second leg 174 may include second base portion 192, second extension 194, and second tip 196. Second base portion 192 may extend axially from center portion 170 at clip proximate end 182 to base end 186. Second base portion 192 may have a generally cylindrical shape, which may have a diameter smaller than a diameter of holes 60. Second extension 194 may extend axially from base end 186 to extension end 188. Second extension 194 may have a generally cylindrical shape, which may have a diameter smaller than a diameter of second base portion 192. Second tip 196 may extend axially from extension end 188 to clip distal end 184. Second tip 196 may have a generally frusto-conical shape, having a diameter less than a diameter of holes 60 at clip distal end 184 and a diameter larger than a diameter of second extension 194 at extension end 188. Second tip 196 may include second notch surface 198 at extension end 188. Second notch surface 198 may be disposed generally orthogonal to longitudinal axis 24.

To connect first clamp shell 26 with second clamp shell 28 using clip 68, first leg 172 of clip 68 may pass through holes 60 in first and third hinge knuckles 48, 56 such that first notch surface 190 abuts against first end surface 64 (see FIGS. 2, 3). Likewise second leg 174 of clip 68 may pass through holes 60 in second and fourth hinge knuckles 50, 58 such that second notch surface 198 abuts against second end surface 66 (see FIGS. 2, 3). Center portion 170 of clip 68 may exert a spring force to bias first and second legs 172, 174 diametrically apart from each other. The spring force exerted by center portion 170 may help first and second notch surfaces 190, 198 engage with first and second end surfaces 64, 66, respectively, to help ensure that clip 68 does not come out from holes 60. To remove clip 68, a flat head screwdriver or other similar tool may be used to push first and second tips 180, 196 radially inward so that first and second notch surfaces 190, 198 may slide relative to first and second end surfaces 64, 66, respectively, until first and second notch surfaces 190, 198 no longer engage with first and second end surfaces 64, 66, respectively. Clip 68 may then be pulled out of holes 60 to allow first and second clamp shells 26, 28 to be separated.

Figure 7:
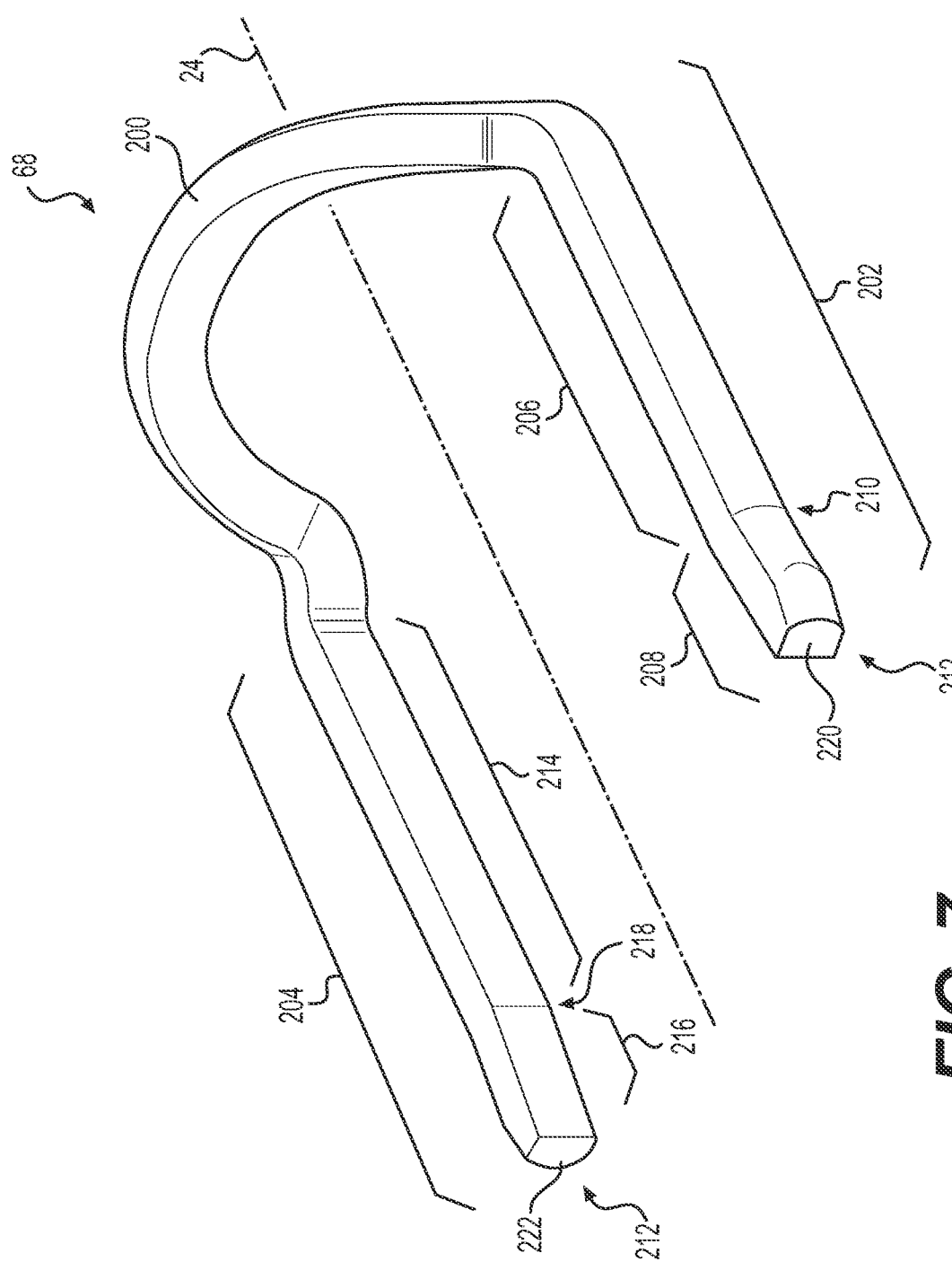
FIG. 7 is an illustration of another exemplary disclosed clip for the conduit connection system of FIG. 3.

FIG. 7 illustrates another exemplary embodiment of clip 68. As illustrated in FIG. 7, clip 68 may include center portion 200, first leg 202, and second leg 204. Center portion 200 may have a generally semi-circular shape, which may be disposed generally orthogonal to longitudinal axis 24. First and second legs 202, 204 may be disposed generally orthogonal to center portion 200 and generally parallel to longitudinal axis 24. First and second legs 202, 204 may extend outward from center portion 200 and may be diametrically spaced apart from each other. First and second legs 202, 204 may have a cross-section smaller than a cross-sectional area of holes 60.

First leg 202 may include first body portion 206 and first tip portion 208. First body portion 206 may extend axially from center portion 200 to first knee 210. First tip portion 208 may extend from first knee 210 to tip end 212. Second leg 204 may include second body portion 214 and second tip portion 216. Second body portion 214 may extend axially from center portion 200 to second knee 218. Second tip portion 216 may extend from second knee 218 to tip end 212. First and second tip portions 208, 216 may be inclined relative to first and second body portions 206, 214, respectively, and relative to longitudinal axis 24 such that a diametrical distance between first and second tips 220, 222 is larger than a diametrical distance between first and second body portions 206, 214.

To connect first clamp shell 26 with second clamp shell 28 using clip 68, first leg 202 of clip 68 may pass through holes 60 in first and third hinge knuckles 48, 56 such that first knee 210 projects out of hole 60 in first hinge knuckle 48 adjacent to first end surface 64. Likewise second leg 204 of clip 68 may pass through holes 60 in second and fourth hinge knuckles 50, 58 such that second knee 218 projects out of hole 60 in fourth hinge knuckle 58 adjacent to first second end surface 66. Center portion 200 of clip 68 may exert a spring force to bias first and second legs 202, 204 diametrically apart from each other. The spring force exerted by center portion 200 may help drive first and second body portions 206, 214 of clip 68 radially outward to push against inner surfaces of holes 60. Moreover, because the diametrical distance between first and second tips 220, 222 is larger than a diametrical distance between first and second body portions 206, 214, first and second tip portions 208, 216 may prevent clip 68 from coming out of holes 60. To remove clip 68, a flat head screwdriver or other similar tool may be used to push first and second tip portions 208, 216 inward so that first and second tips 220, 222 may be pushed into holes 60 in first hinge knuckle 48 and fourth hinge knuckle 58. Clip 68 may then be pulled out of holes 60 to allow first and second clamp shells 26, 28 to be separated.

INDUSTRIAL APPLICABILITY

The disclosed conduit connection system may be used for connecting tubes, pipes, hoses, and other types of conduits that carry pressurized fluids in construction, earth moving, mining, and/or other industrial machinery. The disclosed conduit connection system may provide several advantages. For example, conduit connection system 10 may help quick connection and disconnection of first and second conduits 12, 14, one having first coupling 16 and the other having second coupling 18. Conduit connection system 10 may make it easier to connect/disconnect first and second conduits 12, 14 because assembly of clamp 20 may not require an operator to move first and second conduits 12, 14. In particular, because conduit connection system 10 includes a two piece clamp 20 including first and second clamp shells 26, 28 that may be placed on either side of first and second couplings 16, 18, conduit connection system 10 may help ensure that first and second conduits 12, 14 may be connectable without the need for moving and/or orienting first and second conduits 12, 14.

Further, conduit connection system 10 may help ensure that first and second conduits 12, 14 remain connected even if connector 22 is inadvertently not installed, removed, or when connector 22 degrades or fails. Specifically, first and second projections 128, 130, may engage with first and second undercuts 30, 36, respectively, to help ensure that clamp 20 maintains the connection between first and second conduits 12, 14. In particular, the double undercut feature of clamp 20, including first and second undercuts 30, 36 may allow dovetail tenon 158 of first and second couplings 16, 18 to firmly engage with dovetail mortise 156 of first and second clamp shells 26, 28, respectively, when first and second conduits 12, 14 carry pressurized fluid.

Figure 8:
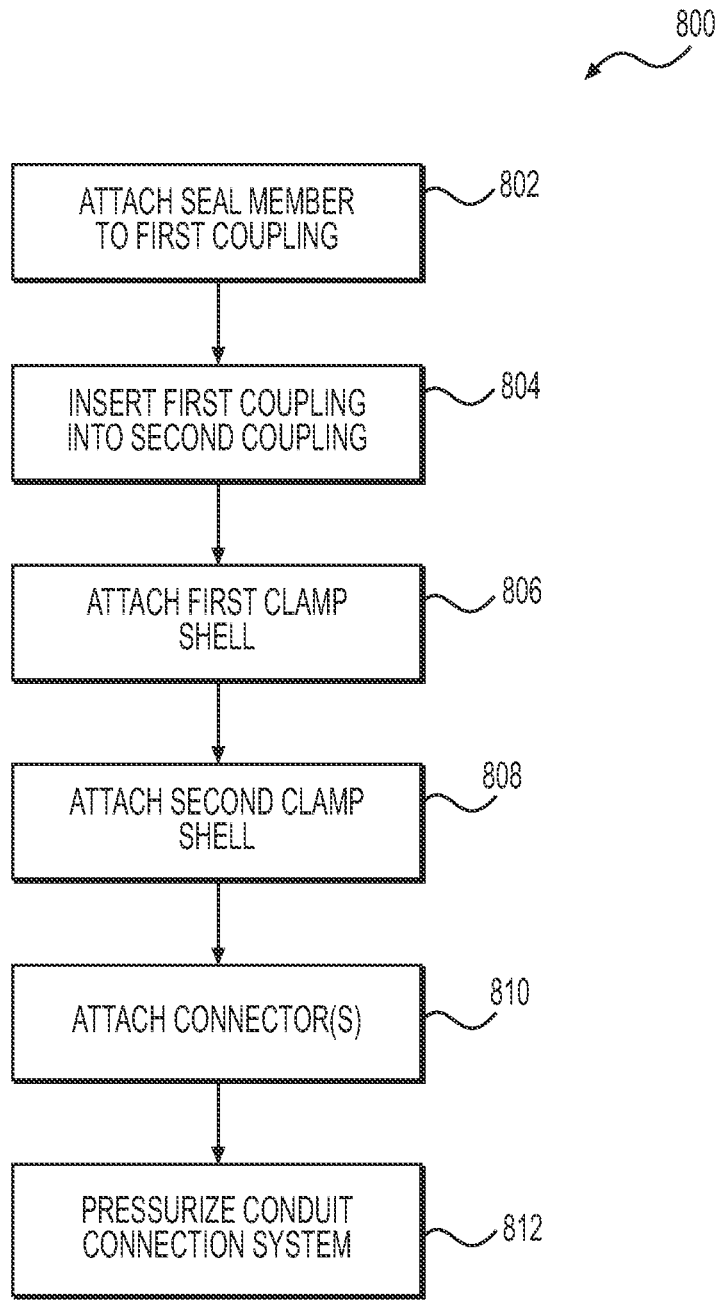
FIG. 8 is a flow chart showing an exemplary disclosed method of assembly of the conduit connection system of FIG. 1.

FIG. 8 discloses an exemplary method 800 of assembly of first and second couplings 16, 18 and clamp 20. Method 800 may include a step of attaching seal member 40 to first coupling 16 (Step 802). For example, one or more seal members 40 may be attached to first coupling 16 such that the one or more seal members 40 are firmly disposed within one or more grooves 32, respectively, in first coupling 16.

Method 800 may include a step of inserting first coupling 16 into second coupling 18 (Step 804). For example, first coupling 16 may be inserted into second coupling 18 such that shoulder outer surface 98 of first coupling 16 may be received in third counterbore 110 of second coupling 18. Inserting shoulder outer surface 98 of first coupling 16 into third counterbore 110 of second coupling 18 may also help ensure that seal members 40 may be disposed between grooves 32 and third counterbore 110.

Method 800 may include a step of attaching first clamp shell 26 to first and second couplings 16, 18 (Step 806). In particular, first clamp shell 26 may be attached to first and second couplings 16, 18 such that first projection 128 of first clamp shell 26 may be received in first undercut 30 of first coupling 16. Further, second projection 130 of first clamp shell 26 may be inserted into second undercut 36 of second coupling 18.

Method 800 may include a step of attaching second clamp shell 28 to first and second couplings 16, 18 (Step 808). In particular, second clamp shell 28 may be attached to first and second couplings 16, 18 such that first projection 128 of second clamp shell 28 may be received in first undercut 30 of first coupling 16. Further, second projection 130 of second clamp shell 28 may be inserted into second undercut 36 of second coupling 18. Attaching first and second clamp shells 26, 28 in this manner may allow dovetail mortises 156 of first and second hubs 46, 54 to engage with first and second undercuts 30, 36 of first and second couplings 16, 18, respectively, to firmly attach first coupling 16 to second coupling 18.

Method 800 may include a step of attaching one or more connectors 22 to first and second clamp shells 26, 28 (Step 810). Attaching connectors 22 may include inserting fasteners 22 into holes 60 of first and third hinge knuckles 48, 56. Fasteners 22 may threadably engage with threads in one or more of holes 60 to attach first clamp shell 26 and second clamp shell 28. In one exemplary embodiment, attaching a connector in step 810 may include inserting a first leg 202 of clip 68 through holes 60 in first and third hinge knuckles 48, 56 and simultaneously inserting second leg 204 of clip 68 through holes 60 in second and fourth hinge knuckles 50, 58. Attaching a connector in step 810 may also include axially inserting clip 68 until first and second tips 180, 196 protrude out from holes 60 and first and second notch surfaces 190, 198 abut against first and second end surfaces 64, 66.

Method 800 may include a step of pressurizing conduit connection system 10 (Step 812). Pressurizing conduit connection system 10 may include pressurizing the fluid in first and second conduits 16, 18. Pressurizing conduit connection system 10, in this manner, may help push first and second couplings 16, 18 axially apart from each other. As first and second couplings 16, 18 move axially apart from each other, second annular face 86 of first undercut 30 may move towards and abut against second face 136 of first projection 128. Likewise, fourth annular face 120 of second undercut 36 may move towards and abut against fourth face 148 of second projection 130. By firmly engaging first and second projections 128, 130 with second and fourth annular faces 86, 120, respectively, of first and second couplings 16, 18, clamp 20 may help ensure that first coupling 16 remains connected with second coupling 18 even if connector 22 is not assembled, has been removed, or has degraded or failed.

The disclosed first and second couplings 16, 18, first and second clamp shells, 26, 28, and/or connectors 22 may be manufactured using conventional techniques such as, for example, stamping, casting, machining, or molding. Alternatively, the disclosed first and second couplings 16, 18, first and second clamp shells, 26, 28, and/or connectors 22 may be manufactured using conventional techniques generally referred to as additive manufacturing or additive fabrication. Known additive manufacturing/fabrication processes include techniques such as, for example, 3D printing. 3D printing is a process wherein material may be deposited in successive layers under the control of a computer.

For example, the computer controls additive fabrication equipment to deposit the successive layers according to a three-dimensional model (e.g. a digital file such as an AMF or STL file) that is configured to be converted into a plurality of slices, for example substantially two-dimensional slices, that each define a cross-sectional layer of first clamp shell 26 in order to manufacture, or fabricate, first clamp shell 26. In one case, the disclosed first clamp shell 26 would be an original component and the 3D printing process would be utilized to manufacture first clamp shell 26. In other cases, the 3D process could be used to replicate an existing first clamp shell 26 and the replicated first clamp shell 26 could be sold as aftermarket parts. These replicated aftermarket first clamp shells 26 could be either exact copies of the original first clamp shell 26 or pseudo copies differing in only non-critical aspects.

Figure 9:
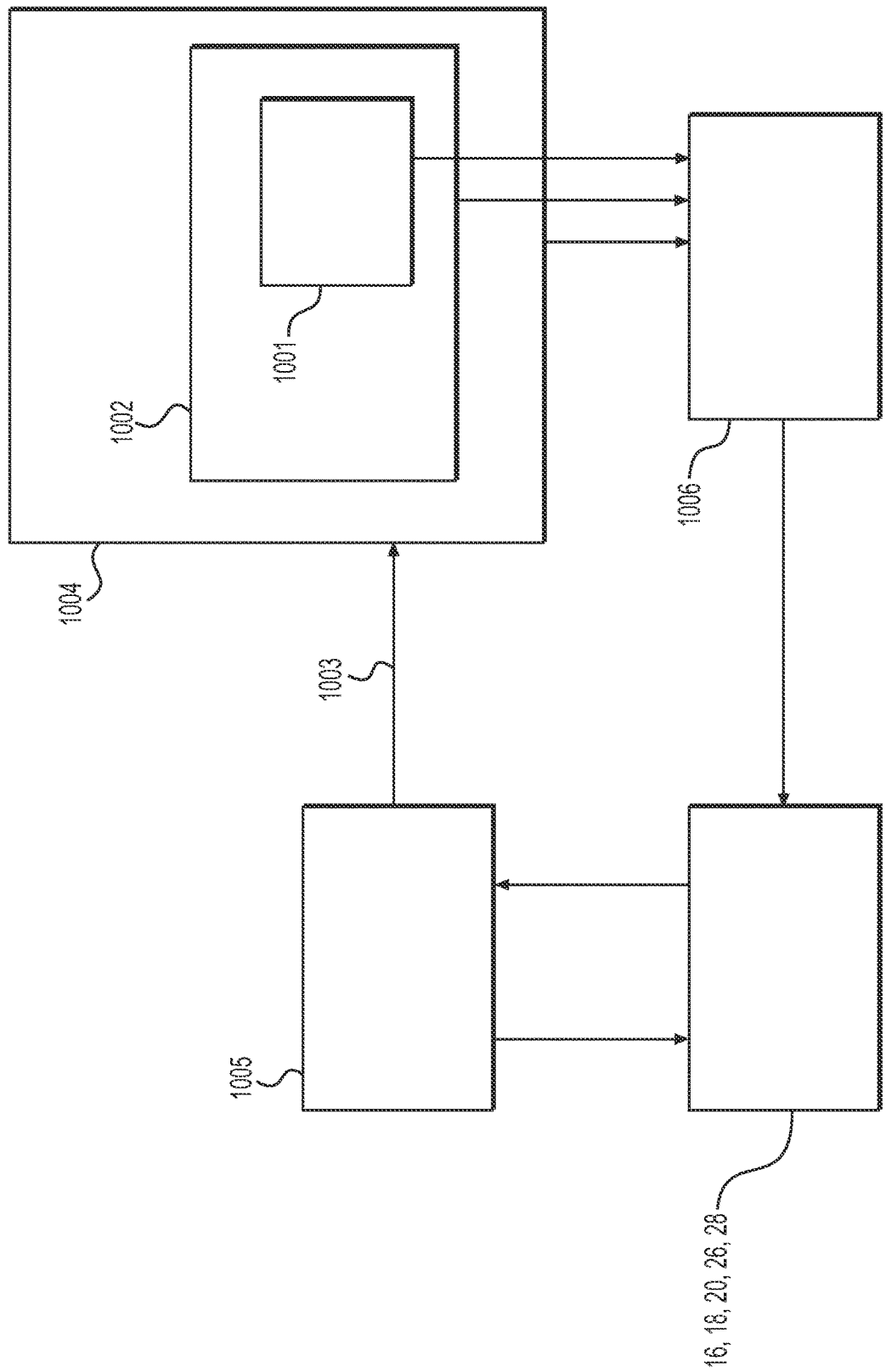
FIG. 9 is a schematic drawing representing a system for generating a three-dimensional model of various components of the conduit connection system of FIGS. 1 and 3.

With reference to FIG. 9, the three-dimensional model 1001 used to represent an original first clamp shell 26 may be on a computer-readable storage medium 1002 such as, for example, magnetic storage including floppy disk, hard disk, or magnetic tape; semiconductor storage such as solid state disk (SSD) or flash memory; optical disc storage; magneto-optical disc storage; or any other type of physical memory on which information or data readable by at least one processor may be stored. This storage medium may be used in connection with commercially available 3D printers 1006 to manufacture, or fabricate, first clamp shell 26. Alternatively, the three-dimensional model may be transmitted electronically to the 3D printer 1006 in a streaming fashion without being permanently stored at the location of the 3D printer 1006. In either case, the three-dimensional model constitutes a digital representation of first clamp shell 26 suitable for use in manufacturing first clamp shell 26.

The three-dimensional model may be formed in a number of known ways. In general, the three-dimensional model is created by inputting data 1003 representing first clamp shell 26 to a computer or a processor 1004 such as a cloud-based software operating system. The data may then be used as a three-dimensional model representing the physical first clamp shell 26. The three-dimensional model is intended to be suitable for the purposes of manufacturing first clamp shell 26. In an exemplary embodiment, the three-dimensional model is suitable for the purpose of manufacturing first clamp shell 26 by an additive manufacturing technique.

In one embodiment depicted in FIG. 9, the inputting of data may be achieved with a 3D scanner 1005. The method may involve contacting first clamp shell 26 via a contacting and data receiving device and receiving data from the contacting in order to generate the three-dimensional model. For example, 3D scanner 1005 may be a contact-type scanner. The scanned data may be imported into a 3D modeling software program to prepare a digital data set. In one embodiment, the contacting may occur via direct physical contact using a coordinate measuring machine that measures the physical structure of first clamp shell 26 by contacting a probe with the surfaces of the first clamp shell 26 in order to generate a three-dimensional model. In other embodiments, the 3D scanner 1005 may be a non-contact type scanner and the method may include directing projected energy (e.g. light or ultrasonic) onto first clamp shell 26 to be replicated and receiving the reflected energy. From this reflected energy, a computer would generate a computer-readable three-dimensional model for use in manufacturing first clamp shell 26. In various embodiments, multiple 2D images can be used to create a three-dimensional model. For example, 2D slices of a 3D object can be combined to create the three-dimensional model. In lieu of a 3D scanner, the inputting of data may be done using computer-aided design (CAD) software. In this case, the three-dimensional model may be formed by generating a virtual 3D model of the disclosed first clamp shell 26 using the CAD software. A three-dimensional model would be generated from the CAD virtual 3D model in order to manufacture the first clamp shell 26.

The additive manufacturing process utilized to create the disclosed first coupling 16 may involve materials such as plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes. Although the exemplary additive manufacturing process has been described with reference to first clamp shell 26, the disclosed additive manufacturing process can also be used to manufacture one or more of first coupling 16, second coupling 18, second clamp shell 28, fastener 22, and clip 68.

It will be apparent to those skilled in the art that various modifications and variations can be made to the disclosed conduit connection system. Other embodiments will be apparent to those skilled in the art from consideration of the specification and practice of the disclosed conduit connection system. It is intended that the specification and examples be considered as exemplary only, with a true scope being indicated by the following claims and their equivalents.

What is claimed is:

1. A conduit connection system, comprising:
   a first coupling connected to a first conduit, the first coupling having a first undercut;
   a second coupling connected to a second conduit, the second coupling having a second undercut;
   a clamp including:
      a first projection configured to be received in the first undercut; and
      a second projection configured to be received in the second undercut; and
   a connector including a pair of spaced apart legs connected to each other, the legs being disposed on opposite sides of a longitudinal axis of the first coupling and the second coupling, the legs being configured to engage with opposing sides of the clamp to connect the first coupling and the second coupling.

2. The conduit connection system of claim 1, wherein the clamp includes:
   a first clamp shell; and
   a second clamp shell, the connector being configured to attach the first clamp shell and the second clamp shell.

3. The conduit connection system of claim 2, wherein the first clamp shell includes:
a first hub;
a first hinge knuckle extending radially outward from the first hub, the first hinge knuckle including a first hole; and
a second hinge knuckle extending radially outward from the first hub, the first hinge knuckle and the second hinge knuckle being disposed on opposite sides of the first hub, the second hinge knuckle including a second hole, at least one of the first hole and the second hole being configured to receive the connector.

4. The conduit connection system of claim 3, wherein the first hub extends axially from a clamp proximate end to a clamp distal end;
the first hinge knuckle extends axially from the clamp proximate end to adjacent a clamp intermediate point disposed between the clamp proximate end and the clamp distal end; and
the second hinge knuckle extends axially from adjacent the clamp intermediate point to the clamp distal end.

5. The conduit connection system of claim 4, wherein the second clamp shell includes:
a second hub;
a third hinge knuckle extending radially outward from the second hub, the third hinge knuckle including a third hole; and
a fourth hinge knuckle extending radially outward from the second hub, the fourth hinge knuckle including a fourth hole, the third hinge knuckle and the fourth hinge knuckle being disposed on opposite sides of the second hub, at least one of the third hole and the fourth hole being configured to receive the connector.

6. The conduit connection system of claim 5, wherein the second hub extends axially from the clamp proximate end to the clamp distal end;
the third hinge knuckle extends axially from the clamp distal end to adjacent the clamp intermediate point; and
the fourth hinge knuckle extends axially from the clamp proximate end to adjacent the clamp intermediate point.

7. The conduit connection system of claim 6, wherein the first hinge knuckle abuts against the third hinge knuckle such that the first hole and the third hole are substantially axially aligned; and
the second hinge knuckle abuts against the fourth hinge knuckle such that the second hole and the fourth hole are substantially axially aligned.

8. The conduit connection system of claim 7, wherein the connector is a clip, including:
a center portion; and
wherein the legs include:
a first leg extending from the center portion, the first leg being disposed generally orthogonal to the center portion and configured to be received in the first hole and the third hole; and
a second leg extending from the center portion, the second leg being disposed generally orthogonal to the center portion and configured to be received in the second hole and the fourth hole.

9. The conduit connection system of claim 1, wherein the second coupling includes a counterbore configured to receive the first coupling;
the first coupling includes a groove axially separated from the first undercut; and
a seal member is disposed in the groove between an outer surface of the first coupling and the counterbore.

10. A coupling, comprising:
an outer surface extending from a coupling proximate end to a coupling distal end, the outer surface being generally cylindrical and disposed about a longitudinal axis; and
an undercut disposed on the outer surface between the coupling proximate end and the coupling distal end, the undercut including:
a first annular surface disposed between the coupling proximate end and the coupling distal end, the first annular surface being generally orthogonal to the longitudinal axis;
a second annular surface disposed between the first annular surface and the coupling distal end, the second annular surface being axially spaced apart from the first annular surface and being inclined relative to the longitudinal axis; and
an undercut inner surface extending axially between the first annular surface and the second annular surface, a portion of the undercut inner surface having a generally conical shape adjacent the first annular surface.

11. The coupling of claim 10, wherein the undercut inner surface includes:
a first portion extending axially from the second annular surface to adjacent an undercut intermediate point disposed between the first annular surface and the second annular surface, the first portion having a generally cylindrical surface; and
a second the portion of the undercut inner surface having a generally conical shape is a second portion extending axially from the first annular surface to adjacent the undercut intermediate point, the second portion having a generally conical surface.

12. The coupling of claim 11, wherein the second portion has a first diameter adjacent the first annular surface and a second diameter adjacent the undercut intermediate point, the second diameter being smaller than the first diameter.

13. The coupling of claim 11, further including a groove disposed between the undercut and the coupling proximate end, the groove being disposed circumferentially around the outer surface.

* * * * *